United States Patent
Cheng et al.

(10) Patent No.: US 12,536,671 B2
(45) Date of Patent: Jan. 27, 2026

(54) FITNESS POSTURE GUIDANCE METHOD AND FITNESS POSTURE GUIDANCE SYSTEM

(71) Applicant: Wistron Corporation, New Taipei (TW)

(72) Inventors: Hong-Ting Cheng, New Taipei (TW); Chia-Yin Li, New Taipei (TW); Hao Chen Weng, New Taipei (TW)

(73) Assignee: Wistron Corporation, New Taipei (TW)

( * ) Notice: Subject to any disclaimer, the term of this patent is extended or adjusted under 35 U.S.C. 154(b) by 309 days.

(21) Appl. No.: 18/446,466

(22) Filed: Aug. 8, 2023

(65) Prior Publication Data

US 2024/0404080 A1   Dec. 5, 2024

(30) Foreign Application Priority Data

May 30, 2023   (TW) ................. 112120132

(51) Int. Cl.
*G06T 7/246* (2017.01)
*G06T 7/73* (2017.01)

(52) U.S. Cl.
CPC ............ *G06T 7/246* (2017.01); *G06T 7/73* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

2022/0139253 A1* 5/2022 Chen .................... G06V 10/751
434/247

FOREIGN PATENT DOCUMENTS

| CN | 111790103 | 10/2020 |
| TW | 202218719 | 5/2022 |

OTHER PUBLICATIONS

Human Pose Estimation for Fitness Exercise Movement Correction. Rahmadani et al. (Year: 2022).*

* cited by examiner

*Primary Examiner* — Delomia L Gilliard
(74) *Attorney, Agent, or Firm* — JCIPRNET

(57) ABSTRACT

A fitness posture guidance method and a fitness posture guidance system are provided. A setting of a plurality of target fitness postures and one attention part of a target fitness action is received. A plurality of target frames respectively corresponding to the target fitness postures are obtained from an expert video according to a plurality of marked times. A professional angle range of the attention part of each of the target fitness postures is obtained based on a plurality of body feature points of each of the target frames to generate an expert motion model. The expert motion model is integrated with an application motion model to generate a final motion model including a final angle range of the attention part of each of the target fitness postures. A prompt function is executed according to the final motion model and multiple body postures in a real-time video stream.

20 Claims, 14 Drawing Sheets

FITNESS POSTURE GUIDANCE METHOD AND FITNESS POSTURE GUIDANCE SYSTEM

CROSS-REFERENCE TO RELATED APPLICATION

This application claims the priority benefit of Taiwan application serial no. 112120132 filed on May 30, 2023. The entirety of the above-mentioned patent application is hereby incorporated by reference herein and made a part of this specification.

BACKGROUND

Technical Field

The disclosure relates a fitness assistance method, and in particular relates to a fitness posture guidance method and a fitness posture guidance system.

Description of Related Art

As society advances in civilization, modern individuals increasingly aspire to maintain not only their physical well-being, but also to possess a more aesthetically pleasing physique. Fitness is one of the important ways to achieve this goal, so going to the gym to exercise and receiving professional coaching is gradually becoming popular. However, the development of the pandemic in recent years has significantly reduced the number of people using traditional gyms. Due to the consideration of epidemic prevention, many individuals have commenced home-based fitness regimens in order to reduce the probability of exposure to the virus.

Therefore, the demand for home-based fitness regimens has gradually received considerable attention, and fitness applications and fitness videos focusing on home-based fitness regimens have begun to appear on the market. However, the majority of current fitness applications only record the exercise duration of the user, without the ability to accurately discern the correctness of the motion action of the user, thereby rendering them incapable of precisely calculating the exercise-induced caloric expenditure of the user. That is to say, when users are exercising using these fitness applications and fitness videos, it is often difficult for users to identify whether the fitness posture is correct, which reduces the fitness effect, and has no way of knowing how to make the fitness posture more up to standard.

SUMMARY

In view of this, a fitness posture guidance method and a fitness posture guidance system, which allow users to obtain timely fitness posture guidance in the process of exercising alone, are provided in the embodiments of the disclosure, so as to improve the efficiency and safety of fitness exercises.

A fitness posture guidance method of an embodiment of the disclosure includes (but is not limited to) the following operation. A setting of multiple target fitness postures and at least one attention part of a target fitness action is received. Multiple target frames respectively corresponding to the target fitness postures are obtained from an expert video according to multiple marked times. A professional angle range of the at least one attention part of each of the target fitness postures is obtained based on multiple body feature points of each of the target frames to generate an expert motion model of the target fitness action. The expert motion model is integrated with an application angle range of the at least one attention part for each of the target fitness postures in an application motion model to generate a final motion model including a final angle range of the at least one attention part of each of the target fitness postures. A prompt function is executed according to the final motion model and multiple body postures in a real-time video stream captured by an image capture device.

A fitness posture guidance system of an embodiment of the disclosure includes (but not limited to) a server device and a user terminal device. The user terminal device includes an image capture device and is connected to the server device through a network. The server device is configured to execute the following operation. A setting of multiple target fitness postures and at least one attention part of a target fitness action is received. Multiple target frames respectively corresponding to the target fitness postures are obtained from an expert video according to multiple marked times. A professional angle range of the at least one attention part of each of the target fitness postures is obtained based on multiple body feature points of each of the target frames to generate an expert motion model of the target fitness action. The expert motion model is integrated with an application angle range of the at least one attention part for each of the target fitness postures in an application motion model to generate a final motion model including a final angle range of the at least one attention part of each of the target fitness postures. The user terminal device is configured to execute the following operation. The final motion model of the target fitness action is obtained from the server device. A prompt function is executed according to the final motion model and multiple body postures in a real-time video stream captured by an image capture device.

Based on the above, in the embodiment of the disclosure, after setting multiple target fitness postures and at least one attention part of the target fitness action, the expert motion model of the target fitness action may be established according to multiple target frames corresponding to multiple marked times in the expert video. In addition, the expert motion model may be integrated with the application motion model established based on general user data to obtain a final motion model that is more suitable for determining whether the user has completed the target fitness action. Therefore, the user terminal device may identify whether the actual posture of the user conforms to the standards of the final motion model according to the real-time video stream generated by capturing the user, and accordingly provide prompts on fitness posture guidance to the user.

In order to make the above-mentioned features and advantages of the disclosure comprehensible, embodiments accompanied with drawings are described in detail below.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the method and system within the scope of the patent application of the disclosure.

In addition, terms "first," "second" and the like mentioned in the full text (including the scope of the patent application) of the description of this application are used only to name the elements or to distinguish different embodiments, scopes, or elements, and are not intended to limit the upper or lower limit of the number of the elements, nor is it intended to limit the order of the elements.

Figure 1A:
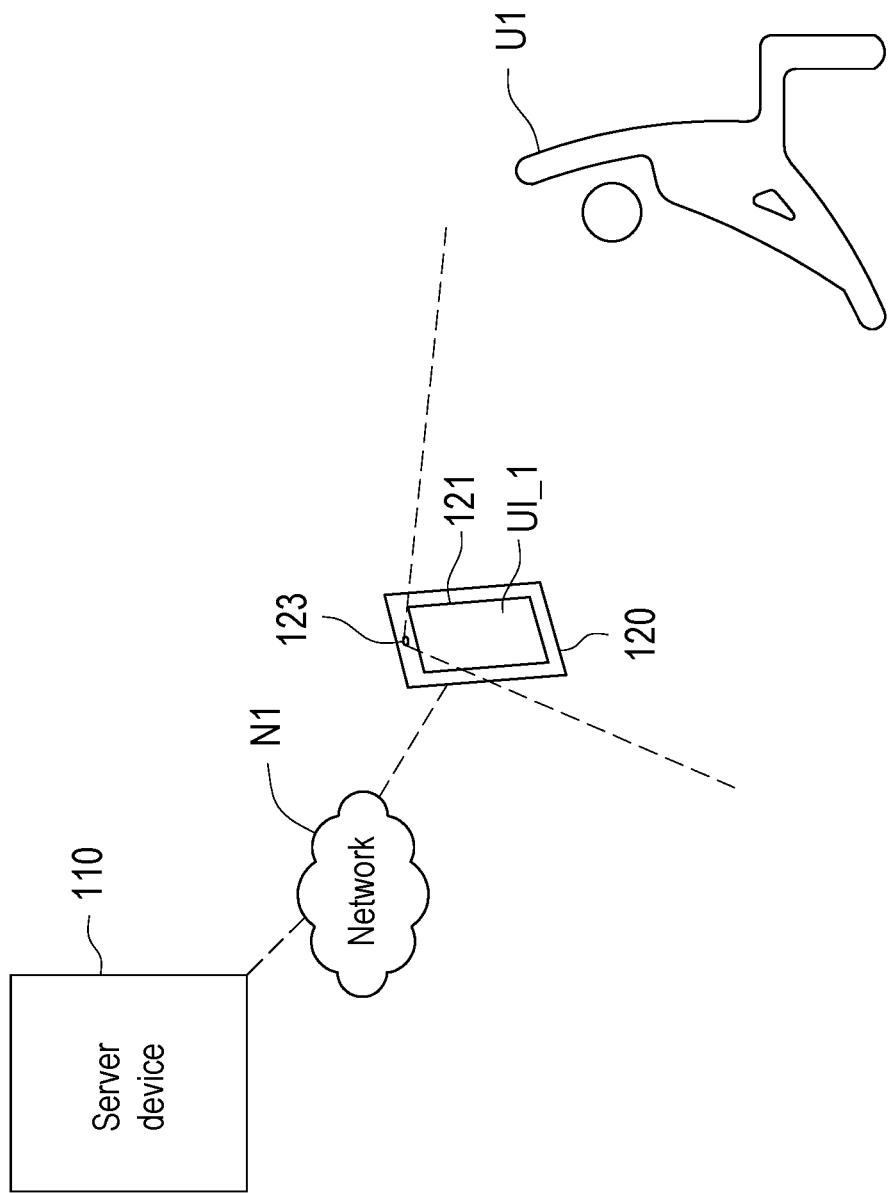
FIG. 1A is a schematic diagram of a fitness posture guidance system according to an embodiment of the disclosure.
Figure 1B:
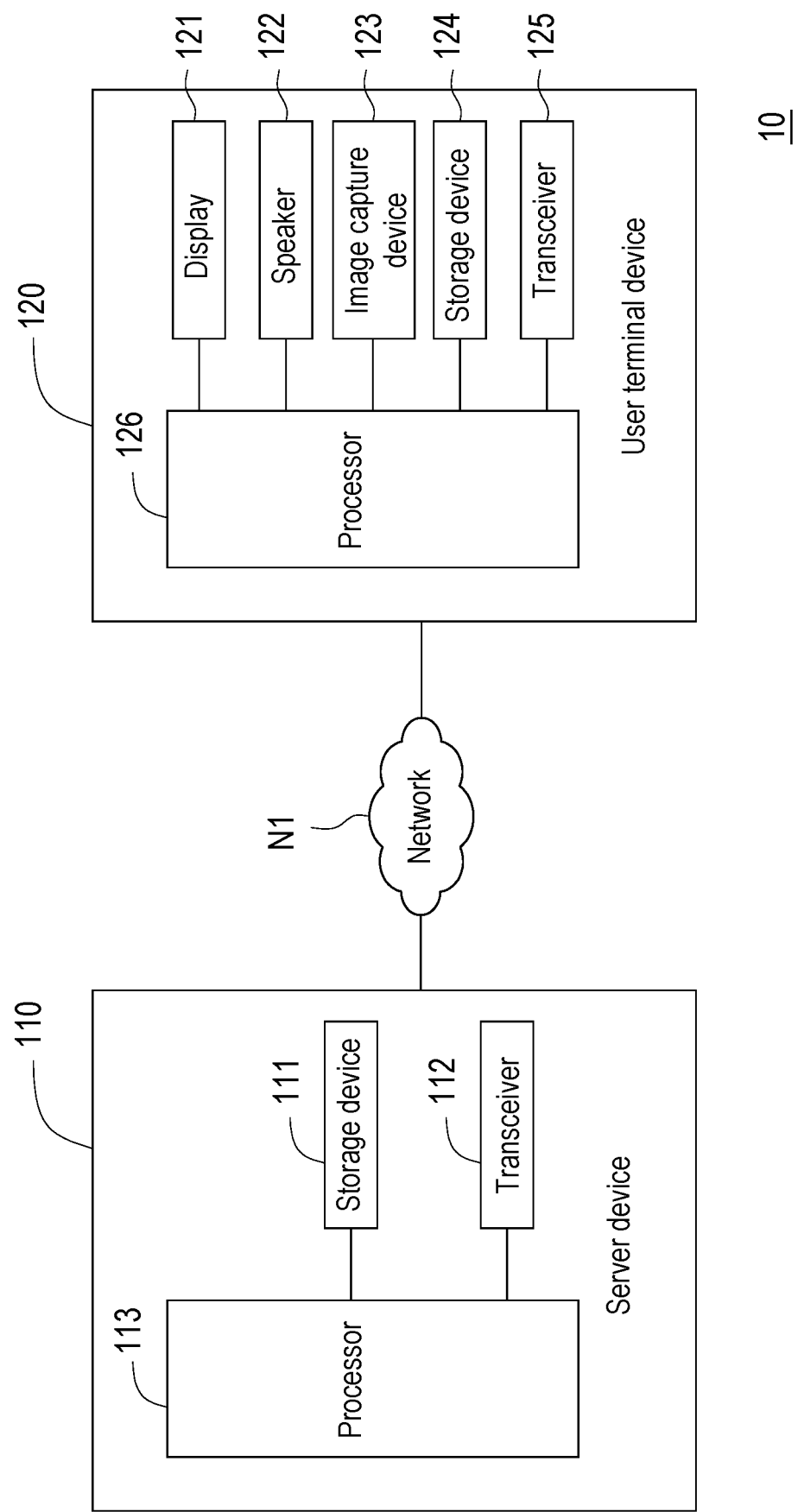
FIG. 1B is a block diagram of a fitness posture guidance system according to an embodiment of the disclosure.

FIG. 1A is a schematic diagram of a fitness posture guidance system according to an embodiment of the disclosure. FIG. 1B is a block diagram of a fitness posture guidance system according to an embodiment of the disclosure. Referring to FIG. 1A and FIG. 1B, a fitness posture guidance system 10 includes (but not limited to) a server device 110 and a user terminal device 120. The user terminal device 120 may be an electronic device with a camera function such as a smart phone, a tablet, or a laptop. The server device 110 may be realized by a single server, or by multiple separate servers with different functions and capable of communicating with each other, which is not limited in the disclosure.

The user terminal device 120 is connected to the server device 110 through the network N1. The network N1 may include any of a variety of wireless and/or wired networks. For example, the network N1 may include any combination of public and/or private networks, local area networks and/or wide area networks, etc. Additionally, the network N1 may utilize one or more wired and/or wireless communication technologies. In some embodiments, the network N1 may include, for example, a cellular mobile network or other mobile network, a wireless local area network (WLAN), a wireless wide area network (WWAN), and/or the Internet.

As shown in FIG. 1A, in some embodiments, during the fitness process of the user U1, an image capture device 123 of the user terminal device 120 may capture images towards the user U1 to generate a real-time video stream including continuous video frames. The user terminal device 120 may compare the final motion model established by the server device 110 with the body posture in the real-time video stream to determine whether the fitness posture of the user U1 is up to standard. If the fitness posture of the user U1 is not up to standard, the user terminal device 120 may provide a prompt for improving the fitness posture through the user operation interface UI_1 or other prompting methods. In this way, the user U1 may obtain appropriate fitness guidance in real time during the fitness process.

In the embodiment shown in FIG. 1B, the server device 110 includes a storage device 111, a transceiver 112, and a processor 113. The processor 113 is coupled to the storage device 111 and the transceiver 112. On the other hand, the user terminal device 120 includes a display 121, a speaker 122, an image capture device 123, a storage device 124, a transceiver 125, and a processor 126. The processor 126 is coupled to the display 121, the speaker 122, the image capture device 123, the storage device 124, and the transceiver 125.

The storage device 111 and the storage device 124 are configured to store data such as images, program codes, software modules, etc. The storage device may be, for example, any type of fixed or removable random access memory (RAM), read-only memory (ROM), flash memory, hard disk, or other similar devices, integrated circuits, or a combination thereof.

The transceiver 112 and the transceiver 125 are configured to transmit and receive data, and may perform operations such as low noise amplification, impedance matching, frequency mixing, frequency up/down conversion, filtering, amplification, and/or the like.

The display 121 is, for example, a liquid crystal display (LCD), a light-emitting diode (LED) display, an organic light-emitting diode (OLED) display, or other types of displays, which is not limited in the disclosure. The display 121 may be configured to display the user operation interface of the application program. In some embodiments, the user operation interface displayed on the display 121 may include visual prompts to improve the fitness posture of the user.

The speaker 122 is configured to play sound. In some embodiments, the speaker 122 may play voice prompts to improve the fitness posture of the user.

The image capture device 123 is configured to capture images to generate a real-time video stream, and includes a camera lens having a lens and a photosensitive element. The photosensitive element may be, for example, a charge coupled device (CCD), a complementary metal-oxide semiconductor (CMOS) element or other elements, which is not limited in the disclosure.

The processor 113 and the processor 126 is, for example, a central processing unit (CPU), an application processor (AP), or other programmable general-purpose or special-purpose microprocessor, a digital signal processor (DSP), a graphics processing unit (GPU), an application specific integrated circuit (ASIC), a field programmable gate array circuit (FPGA), or other similar devices, integrated circuits, and combinations thereof. The processor 113 may execute the program codes, software modules, instructions, etc. recorded in the storage device 111 to realize all the operations of the server device 110 hereinafter. The processor 126 may execute the program codes, software modules, instructions, etc. recorded in the storage device 114 to realize all the operations of the user terminal device 120 hereinafter.

Hereinafter, the fitness posture guidance method described in the embodiment of the disclosure will be described in combination with various devices in the fitness posture guidance system 10. Each process step in the method may be adjusted according to the implementation, and is not limited thereto.

Figure 2:
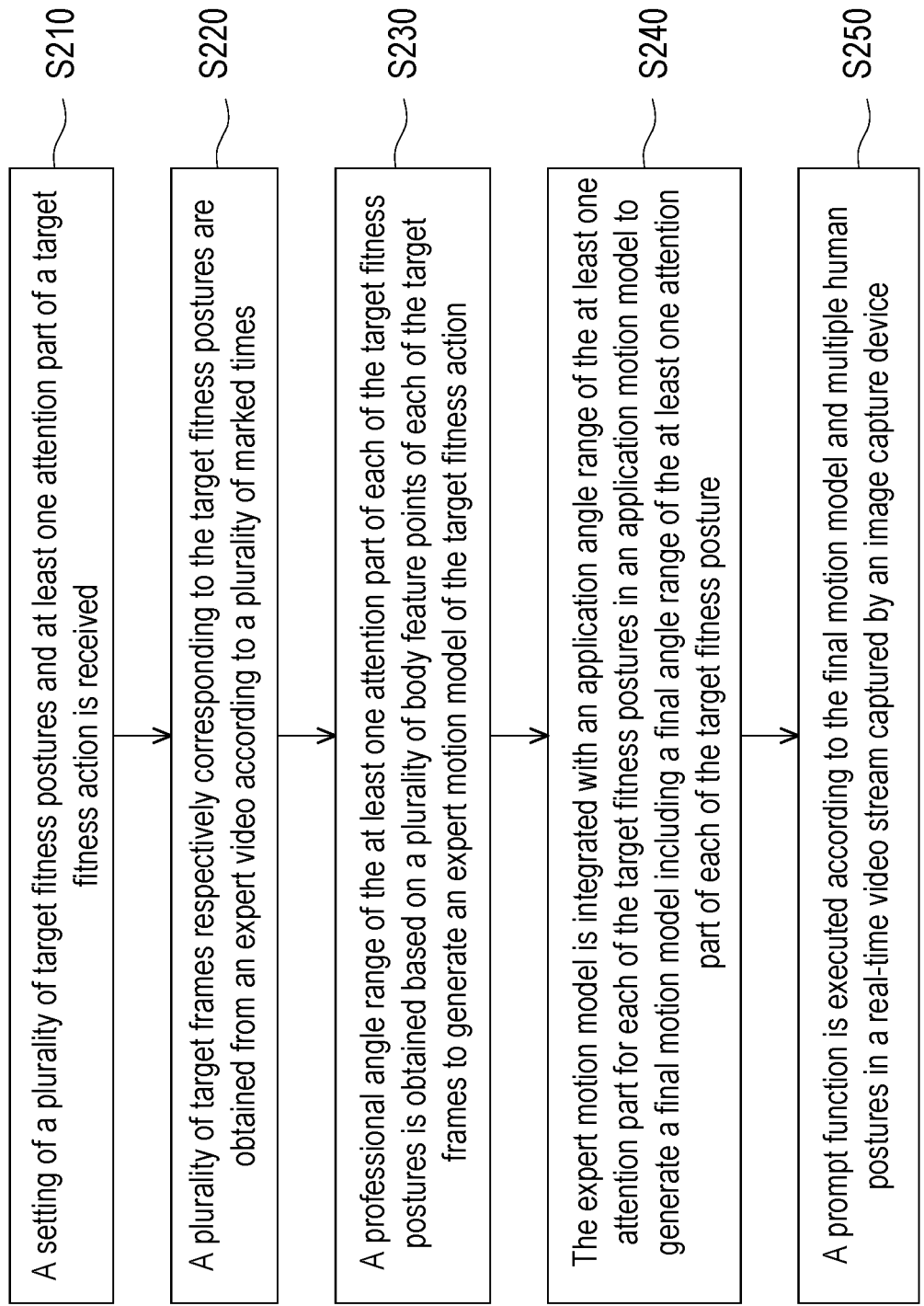
FIG. 2 is a flowchart of a fitness posture guidance method according to an embodiment of the disclosure.

FIG. 2 is a flowchart of a fitness posture guidance method according to an embodiment of the disclosure. Referring to FIG. 1B and FIG. 2, in step S210, the server device 110 receives a setting of multiple target fitness postures and at least one attention part of a target fitness action. The server device 110 may receive a setting (e.g., a manual setting) through an input device (not shown) or the transceiver 112 to set multiple target fitness postures and at least one attention part of the target fitness action.

Specifically, the target fitness action is a continuous action, which may include multiple target fitness postures. For example, the target fitness action "squat" may include at least one standing posture and one squatting posture. The target fitness action "high leg raise" may include at least one right foot raising posture and one left foot raising posture. However, the disclosure is not limited to the number of multiple target fitness postures of the target fitness action, which may be set according to actual applications.

In addition, for different target fitness actions, the attention part required to determine whether the target fitness action is up to standard is not the same. The attention part may be a body joint, such as a knee joint, an elbow joint, or a hip joint, etc. For example, the attention parts of the target fitness action "squat" may include the left knee joint, the right knee joint, the left hip joint, and the right hip joint. It should be noted that, in some embodiments, image-based body action recognition is realized by using skeleton information including multiple body feature points, and whether the motion action of the user is up to standard is determined according to whether the angle of the attention part conforms to expectations. Each attention part may correspond to three body feature points, and the angle of each attention part in the image may be calculated from these three body feature points. For example, the attention part "right knee" may correspond to the right hip joint feature point, the right knee joint feature point, and the right ankle feature point.

In step S220, the server device 110 obtains multiple target frames respectively corresponding to the target fitness postures from the expert video according to multiple marked times. This expert video is a video of a professional trainer performing the target fitness action. In some implementation scenarios, an expert video may be generated by capturing (shooting) a professional trainer who performs the target fitness action n times in a loop. In some embodiments, the server device 110 may obtain multiple expert videos corresponding to different shooting angles.

In some embodiments, the server device 110 may receive multiple marked times. These marked times may be marked manually or by machines (e.g., the server device 110 or other computer devices), which is not limited in the disclosure. In some embodiments, when the target fitness posture has been determined, the marking personnel may watch the expert video and mark multiple marked times corresponding to multiple target fitness postures, so that the server device 110 may obtain the target frames corresponding to the marked times. In other words, by marking the marked times when the target fitness posture appears in the expert video, multiple target frames corresponding to multiple target fitness postures may be obtained according to the marked times. Each marked time may be marked as corresponding to one of the target fitness postures, and each target frame also corresponds to one of the target fitness postures. For example, since the professional trainer executes the target fitness action in the expert video n times in a loop, each target fitness posture of the target fitness action may correspond to n target frames in the expert video.

In step S230, the server device 110 obtains the professional angle range of at least one attention part of each target fitness posture based on the body feature points of each target frame, and generates an expert motion model of the target fitness action. In detail, the server device 110 may perform body skeleton recognition on target frames including professional trainers, and may obtain multiple body feature points of each target frame. In other words, these body feature points may be skeleton nodes. The server device 110 may use a convolutional neural network model or other skeleton recognition algorithms to recognize multiple body feature points in each target frame.

Figure 3:
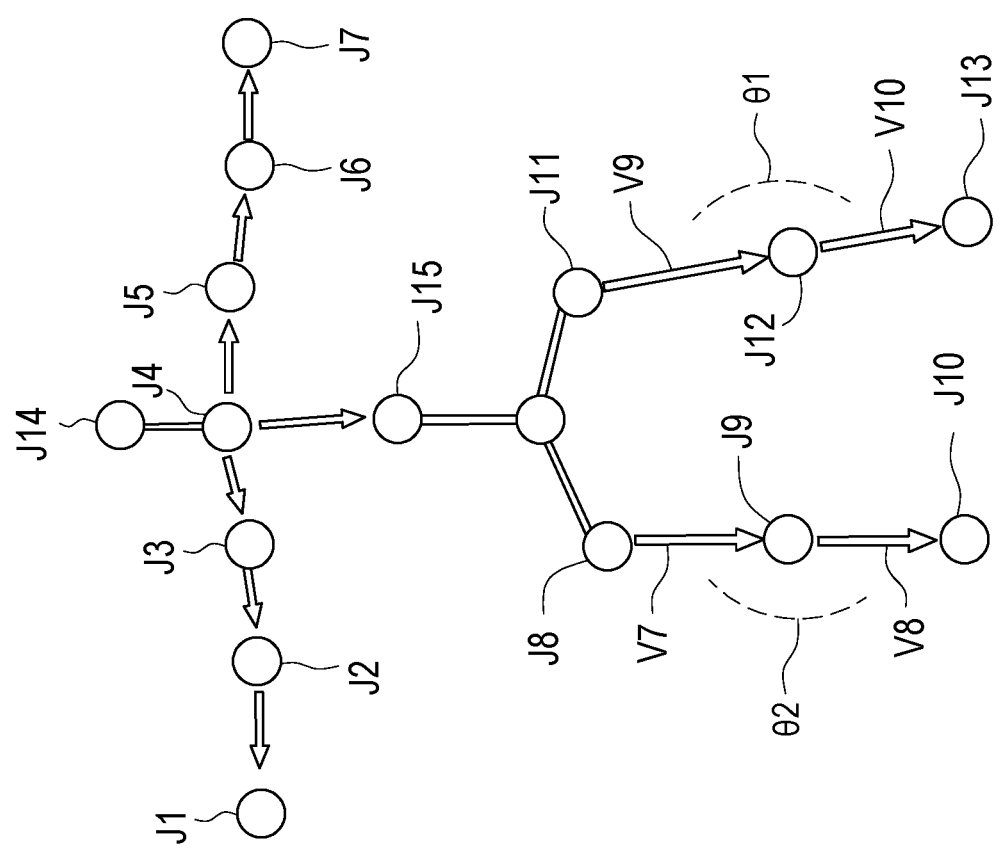
FIG. 3 is a schematic diagram of body feature points and attention parts according to an embodiment of the disclosure.

For example, FIG. 3 is a schematic diagram of body feature points and attention parts according to an embodiment of the disclosure. Referring to FIG. 3, the server device 110 may obtain skeleton information including body feature points J1 to J16 in a target frame. It is assumed that the attention parts are the left knee joint and the right knee joint. The server device 110 calculates the limb vector V7 according to the joint points J8 and J9, and calculates the limb vector V8 according to the joint points J9 and J10. Then, the server device 110 may calculate the angle between the limb vector V7 and the limb vector V8 to obtain the angle θ2 of the attention part "left knee joint". Similarly, the server device 110 calculates the limb vector V9 according to the joint points J11 and J12, and calculates the limb vector V10 according to the joint points J12 and J13. Then, the server device 110 may calculate the angle between the limb vector V9 and the limb vector V10 to obtain the angle θ1 of the attention part "right knee joint".

Then, the server device 110 may obtain corresponding professional angle ranges for each attention part of each target fitness posture according to the body feature points in the target frames respectively corresponding to the target fitness actions. In this way, for a target fitness action, the server device 110 may establish an expert motion model including the professional angle range of each attention part of each target fitness posture.

For example, Table 1 may be an expert motion model established by the server device 110 for the target fitness action "squat". It is assumed that the target fitness action "squat" includes two target fitness postures, which are squatting posture and standing posture respectively.

TABLE 1

| Squat | |
| --- | --- |
| First target fitness posture | Standing posture |
| First attention part | Right knee joint |
| First maximum angle | 180 degrees |
| First minimum angle | 169 degrees |
| Second attention part | Left knee joint |
| Second maximum angle | 178 degrees |
| Second minimum angle | 160 degrees |
| Second target fitness posture | Squatting posture |
| First attention part | Right knee joint |
| First maximum angle | 85 degrees |
| First minimum angle | 67 degrees |
| Second attention part | Left knee joint |

TABLE 1-continued

| Squat | |
|---|---|
| Second maximum angle | 85 degrees |
| Second minimum angle | 62 degrees |
| Posture sequence | Squatting posture → Standing posture |

However. Table 1 only takes two attention parts of each target fitness posture as an example, but the disclosure is not limited thereto. In addition, the expert motion model in Table 1 also includes the posture sequence of these target fitness postures. The posture sequence of these target fitness postures may be used to identify whether the user completes the target fitness actions correctly, which is described in more detail in subsequent embodiments.

Figure 4:
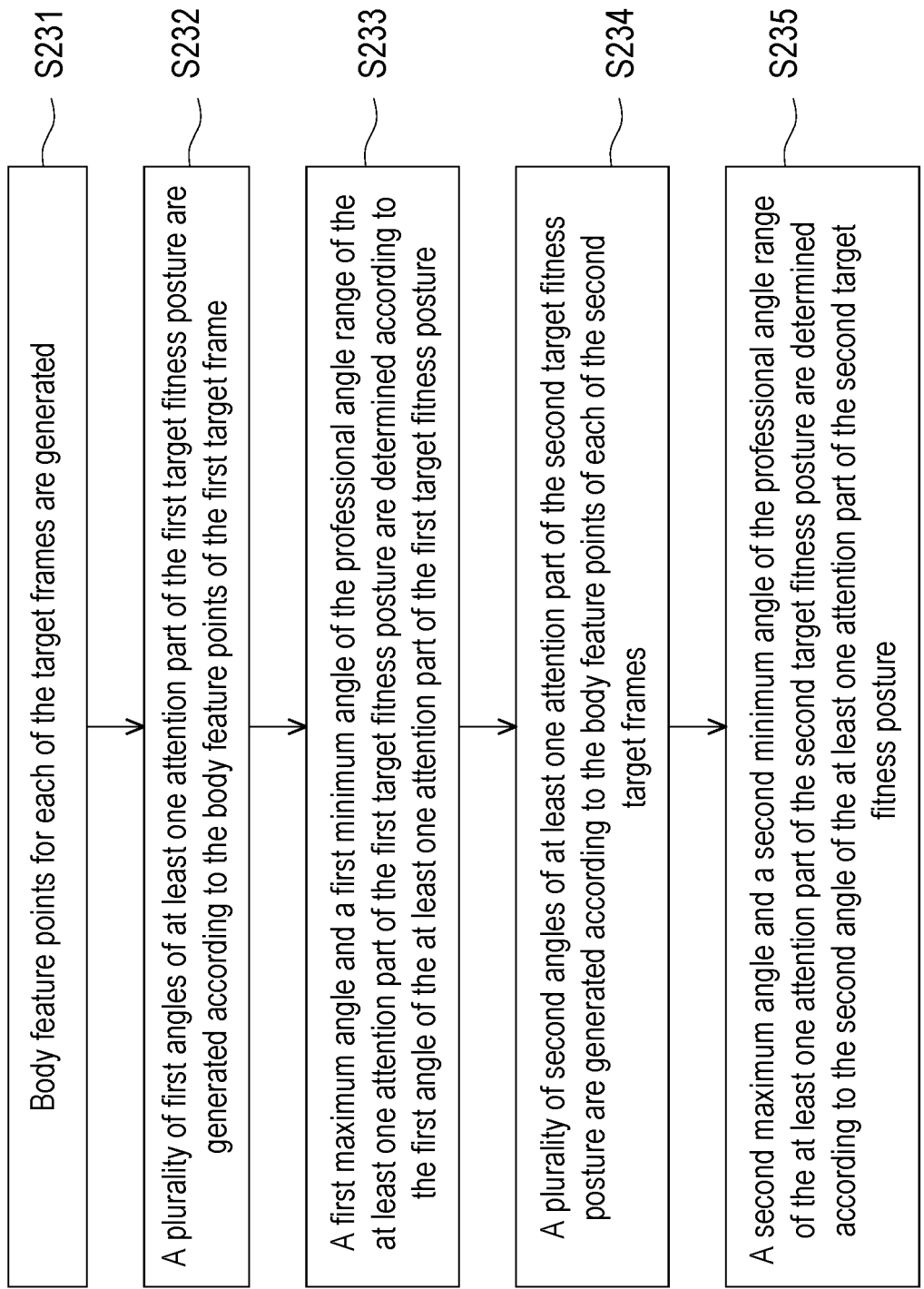
FIG. 4 is a flowchart of generating an expert motion model according to an embodiment of the disclosure.
Figure 5:
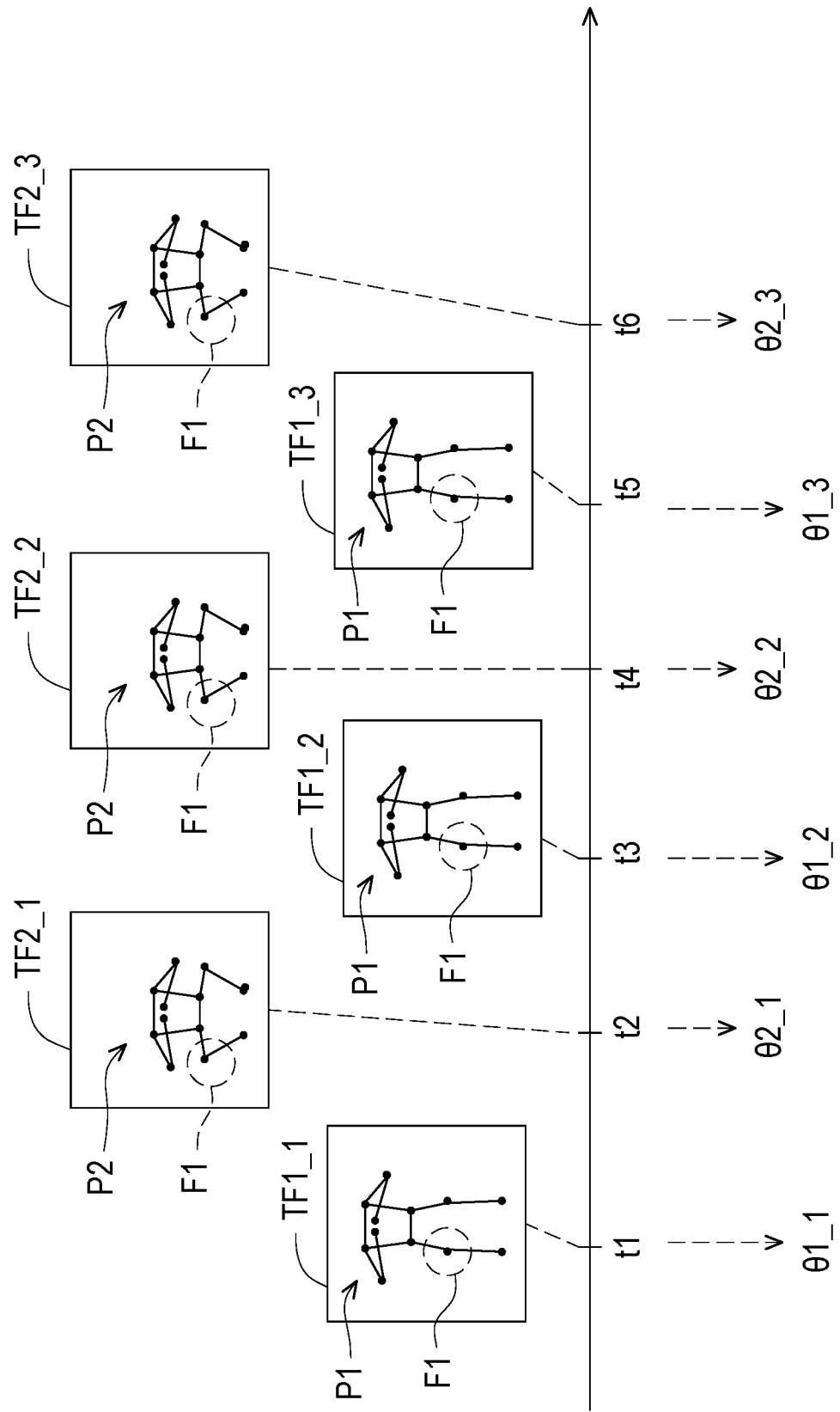
FIG. 5 is a schematic diagram of determining a first maximum angle and a first minimum angle of a professional angle range of an attention part according to an embodiment of the disclosure.

In detail, FIG. 4 is a flowchart of generating an expert motion model according to an embodiment of the disclosure. Referring to FIG. 4, in one embodiment, step S230 may include steps S231 to S235. In addition, to facilitate a better understanding of the concepts of the embodiment of the disclosure, the following description is supplemented with FIG. 5 and the target fitness action "squat." FIG. 5 is a schematic diagram of determining a first maximum angle and a first minimum angle of a professional angle range of an attention part according to an embodiment of the disclosure.

In step S231, the server device 110 generates body feature points of each target frame TF1_1, TF1_2, TF1_3, TF2_1, TF2_2, and TF2_3. Here, the server device 110 obtains the target frames TF1_1, TF1_2, TF1_3, TF2_1, TF2_2, and TF2_3 from the expert video according to the marked times t1 to t6. Multiple target frames TF1_1, TF1_2, TF1_3, TF2_1, TF2_2, and TF2_3 include multiple target frames TF1_1, TF1_2, TF1_3 (i.e., first target frames) all corresponding to the first target fitness posture P1 among the target fitness postures. Additionally, multiple target frames TF1_1, TF1_2, TF1_3, TF2_1, TF2_2, and TF2_3 further include multiple target frames TF2_1, TF2_2, TF2_3 (i.e., second target frames) all corresponding to the second target fitness posture P2 among the target fitness postures.

In step S232, the server device 110 generates multiple first angles $θ1\_1$, $θ1\_2$, and $θ1\_3$ of at least one attention part F1 of the first target fitness posture P1 according to the body feature points of the target frame TF1_1, TF1_2, and TF1_3, (i.e., the first target frames) corresponding to the first target fitness posture P1. For the calculation method of the first angles $θ1\_1$, $θ1\_2$, and $θ1\_3$, please refer to the description of FIG. 3.

In step S233, the server device 110 determines the first maximum angle and the first minimum angle of the professional angle range of at least one attention part F1 of the first target fitness posture P1 according to the first angles $θ1\_1$, $θ1\_2$, and $θ1\_3$ of at least one attention part F1 of the first target fitness posture P1. Specifically, the server device 110 may determine the professional angle range of the attention part F1 of the first target fitness posture P1 according to the maximum reference angle (i.e., the maximum value) and the minimum reference angle (i.e., the minimum value) among the first angles $θ1\_1$, $θ1\_2$, and $θ1\_3$.

In some embodiments, the server device 110 may determine to use the maximum reference angle among the first angles $θ1\_1$, $θ1\_2$, and $θ1\_3$ as the first maximum angle of the professional angle range of the attention part F1 (i.e., the upper limit of the professional angle range), and directly use the minimum reference angle among the first angles $θ1\_1$, $θ1\_2$, and $θ1\_3$ as the first minimum angle of the professional angle range of the attention part F1 (i.e., the lower limit of the professional angle range).

In some embodiments, the server device 110 may obtain the maximum reference angle and the minimum reference angle among the first angles $θ1\_1$, $θ1\_2$, and $θ1\_3$. Next, the server device 110 may generate a first maximum angle and a first minimum angle of the attention part F1 of the first target fitness posture P1 according to the preset adjustment factor, the maximum reference angle, and the minimum reference angle. The preset adjustment factor may be a preset angle or a preset ratio, which may be set according to actual applications. For example, the preset adjustment factor may be 5 degrees. The server device 110 may add 5 degrees to the maximum reference angle among the first angles $θ1\_1$, $θ1\_2$, and $θ1\_3$ to generate the first maximum angle of the professional angle range of the attention part F1 of the first target fitness posture P1. Moreover, the server device 110 may subtract 5 degrees from the minimum reference angle among the first angles $θ1\_1$, $θ1\_2$, and $θ1\_3$ to generate the first minimum angle of the professional angle range of the attention part F1 of the first target fitness posture P1.

It should be noted that, based on a similar method, the server device 110 may generate the professional angle ranges of each attention part of the first target fitness posture P1. That is, the server device 110 may obtain the professional angle ranges of each attention part of the first target fitness posture P1 based on the target frames TF1_1, TF1_2, and TF1_3 corresponding to the first target fitness posture P1.

Thereafter, in step S234, the server device 110 generates multiple second angles $θ2\_1$, $θ2\_2$, and $θ2\_3$ of at least one attention part F1 of the second target fitness posture P2 according to the body feature points of each target frame TF2_1, TF2_2, and TF2_3 (i.e., the second target frames). For the calculation method of the second angles $θ2\_1$, $θ2\_2$, and $θ2\_3$, please refer to the description of FIG. 3.

In step S235, the server device 110 determines the second maximum angle and the second minimum angle of the professional angle range of at least one attention part F1 of the second target fitness posture P2 according to the second angles $θ2\_1$, $θ2\_2$, and $θ2\_3$ of at least one attention part F1 of the second target fitness posture P2. The server device 110 may determine the professional angle range of the attention part F1 of the second target fitness posture P2 according to an operation manner similar to step S233. Similarly, based on a similar method, the server device 110 may also generate the professional angle ranges of each attention part of the second target fitness posture P2. Therefore, the server device 110 may obtain the professional angle ranges of each attention part of the second target fitness posture P2 based on the target frames TF2_1, TF2_2, and TF2_3 corresponding to the second target fitness posture P2.

Returning to FIG. 2, in step S240, the server device 110 integrates the expert motion model with an application angle range of at least one attention part for each target fitness posture in an application motion model to generate a final motion model including a final angle range of at least one attention part of each target fitness posture.

In detail, in some embodiments, in addition to generating an expert motion model based on shooting an expert video generated by a professional trainer, the server device 110 may also generate an application motion model based on shooting a motion video generated by a general user. That is, the application motion model also includes the application angle range of each attention part of multiple target fitness postures of the target fitness action. For example, the model format of the application motion model may be similar to the expert motion model shown in Table 1. Thus, the server device 110 may generate the final motion model by referring to the professional angle range of each attention part of each target fitness posture in the expert motion model and the application angle range of each attention part of each target fitness posture in the application motion model, in which the final motion model includes the final angle range of each attention part of each target fitness posture. For example, the server device 110 may generate a final motion model similar to the model format of Table 1.

In step S250, the user terminal device 120 executes a prompt function according to the final motion model and multiple body postures in a real-time video stream captured by the image capture device 123. In some embodiments, the user terminal device 120 may obtain the final motion model of the target fitness action from the server device 110 through the network N1.

In some embodiments, the user terminal device 120 may periodically fetch the current frame from the real-time video stream at a preset frequency, and may analyze the degree of similarity between the current body posture in the current frame and the current target fitness posture (i.e., one of the multiple target fitness postures). In some embodiments, the user terminal device 120 may compare the final angle range of each attention part of the current target fitness posture in the final motion model with the actual angle of each attention part of the current body posture, so as to obtain the degree of similarity between the current body posture and the current target fitness posture. According to the degree of similarity between the current body posture in the current video frame and the current target fitness posture, the user terminal device 120 may execute a prompt function. Based on this, the user U1 may obtain fitness guidance according to the prompt provided by the user terminal device 120 and improve the fitness posture accordingly.

The following describes an embodiment of model integration and prompt function execution.

Figure 6:
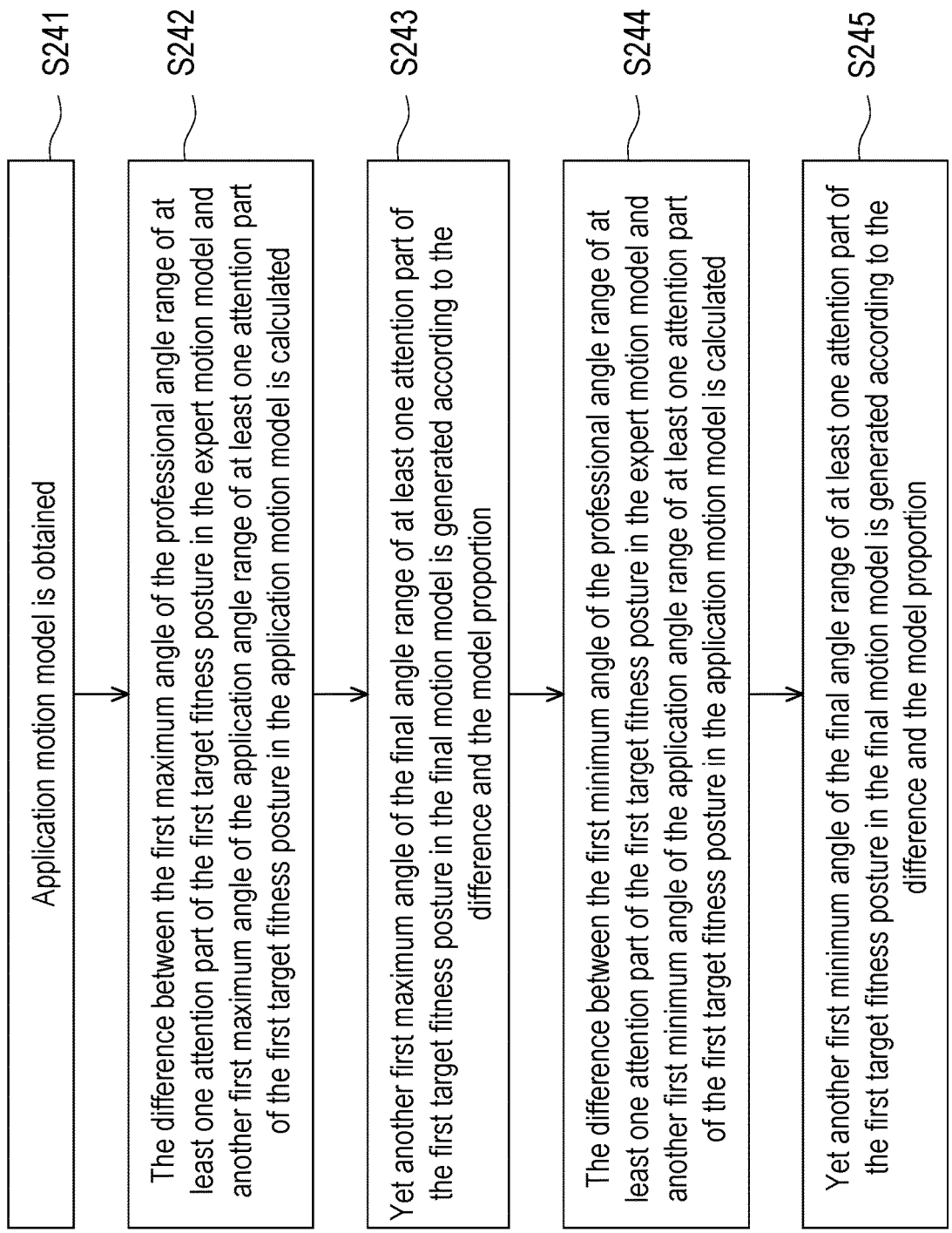
FIG. 6 is a flowchart of integrating an expert motion model and an application motion model according to an embodiment of the disclosure.

FIG. 6 is a flowchart of integrating an expert motion model and an application motion model according to an embodiment of the disclosure. Referring to FIG. 6, in some embodiments, step S240 in FIG. 2 may include steps S241 to S245.

In step S241, the server device 110 obtains the application motion model. As mentioned above, the server device 110 may also generate an application motion model according to motion videos of multiple general users. That is, the application motion model also includes the application angle range of each attention part of multiple target fitness postures of the target fitness action. In some embodiments, the server device 110 may generate multiple user motion models according to multiple motion videos of multiple general users, and then the server device 110 may generate an application motion model according to the user motion models. The method of generating the user motion model is similar to the method of generating the professional motion model in the above-mentioned embodiments, and is not repeated herein.

Figure 7:
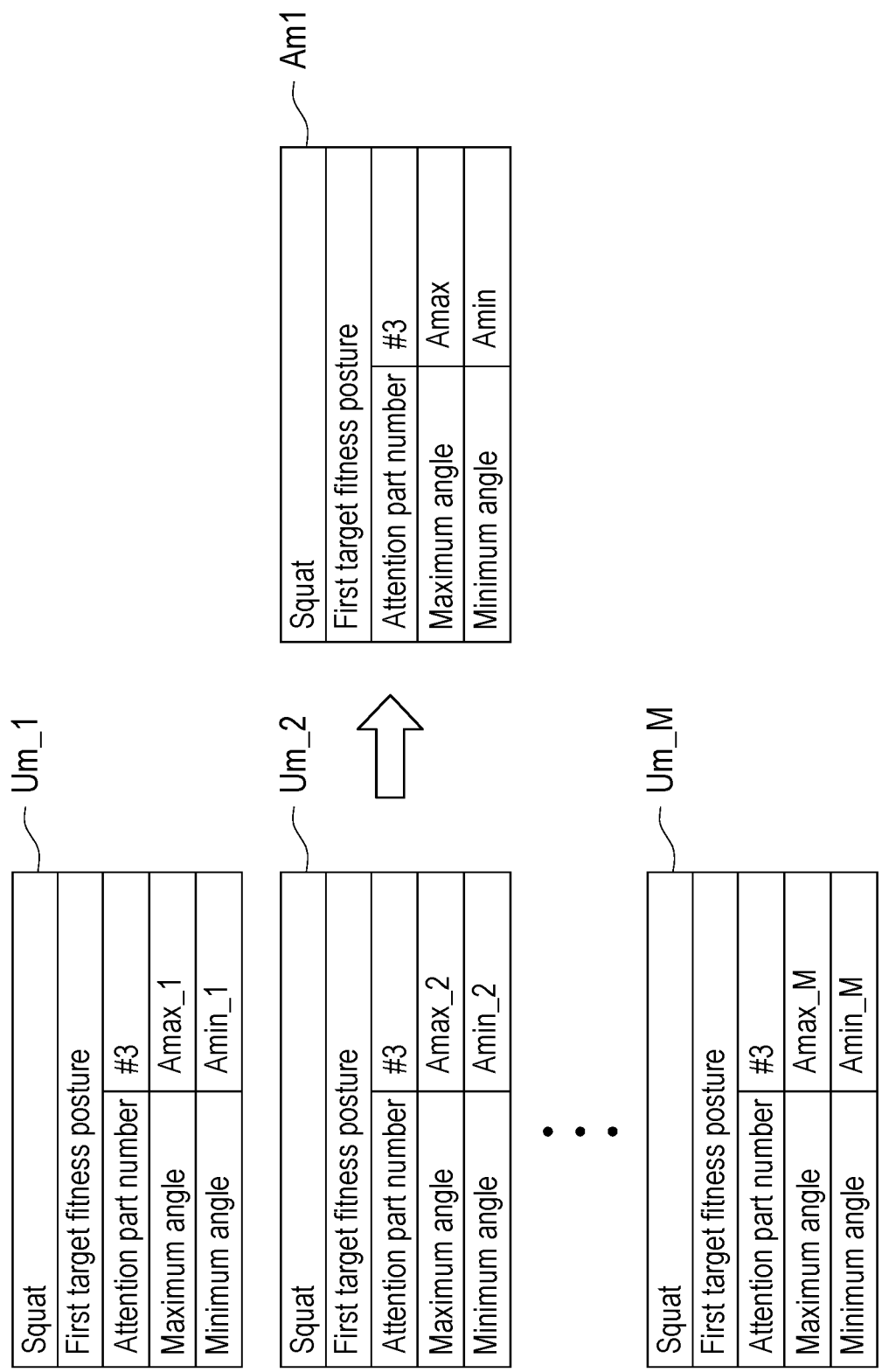
FIG. 7 is a schematic diagram of generating an application motion model according to an embodiment of the disclosure.

FIG. 7 is a schematic diagram of generating an application motion model according to an embodiment of the disclosure. The server device 110 may generate M user motion models Um_1 to Um_M according to M motion videos of M general users. The server device 110 may generate the application motion model Am1 according to the user motion models Um_1 to Um_M.

In detail, the user motion models Um_1 to Um_M respectively include the reference angle range of the attention part of the first target fitness posture. For example, the user motion model Um_1 includes the maximum angle Amax_1 and the minimum angle Amin_1 of the reference angle range of the attention part of the first target fitness posture. The user motion model Um_2 includes the maximum angle Amax_2 and the minimum angle Amin_2 of the reference angle range of the attention part of the first target fitness posture. Next, the server device 110 may compare multiple reference angle ranges in the user motion models Um_1 to Um_M to generate the application motion model Am1.

In some embodiments, the maximum angle Amax of the application angle range of the attention part of the first target fitness posture in the application motion model Am1 is the maximum value of the maximum angles Amax_1 to Amax_M in the user motion models Um_1 to Um_M. In addition, the minimum angle Amin of the application angle range of the attention part of the first target fitness posture in the application motion model Am1 is the minimum value of the minimum angles Amin_1 to Amin_M in the user motion models Um_1 to Um_M. In some embodiments, the server device 110 may also filter the outliers of the maximum angles Amax_1 to Amax_M in the user motion models Um_1 to Um_M, and then find the maximum value to generate the maximum angle Amax. Similarly, the server device 110 may also filter the outliers of the minimum angles Amin_1 to Amin_M in the user motion models Um_1 to Um_M, and then find the minimum value to generate the minimum angle Amin.

In step S242, the server device 110 calculates the difference between the first maximum angle of the professional angle range of at least one attention part of the first target fitness posture in the expert motion model and another first maximum angle of the application angle range of at least one attention part of the first target fitness posture in the application motion model. For example, it is assumed that the target fitness action is squatting. The server device 110 may calculate the angle difference between the maximum angle of the left knee joint of the squatting posture in the expert motion model and the maximum angle of the left knee joint of the squatting posture in the application motion model.

In step S242, the server device 110 generates yet another first maximum angle of the final angle range of at least one attention part of the first target fitness posture in the final motion model according to the difference between the first maximum angle of the professional angle range and another first maximum angle of the application angle range and the model proportion. It should be noted that the model proportion is an adjustable parameter. In different embodiments, the model proportion may be determined according to the type or difficulty setting of the target fitness action. Alternatively, the model proportion may be manually set.

Figure 8:
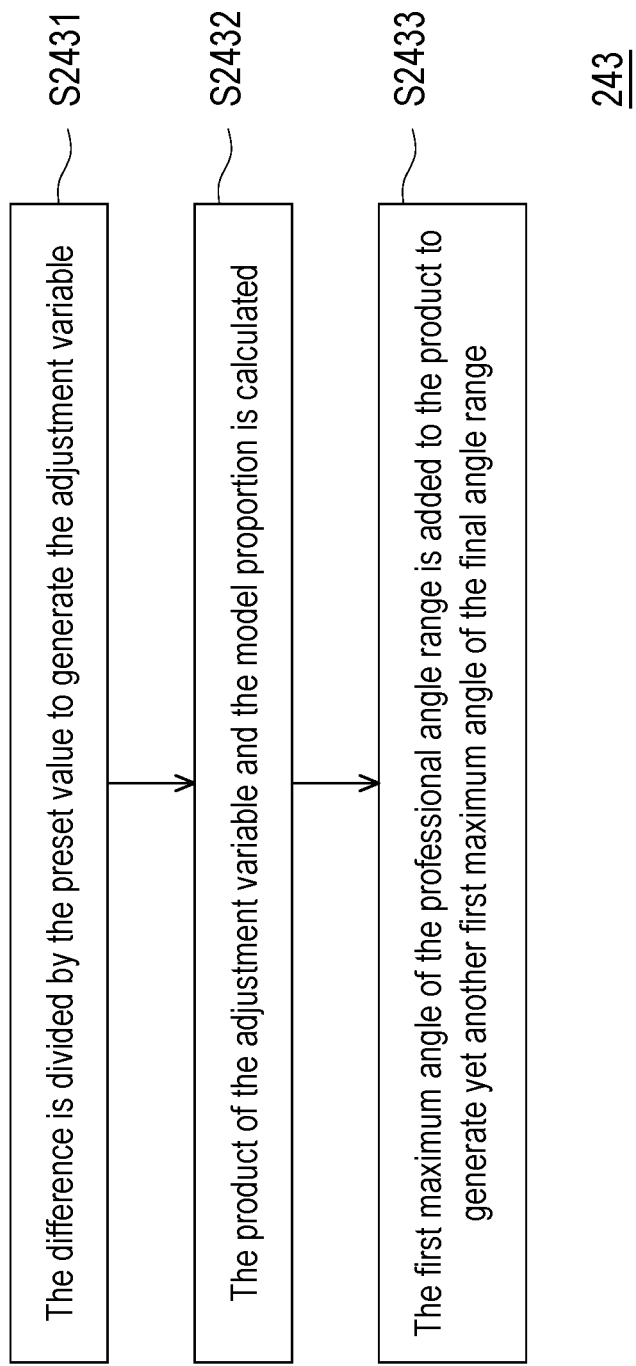
FIG. 8 is a flowchart of generating a first maximum angle of a final angle range of the attention part according to an embodiment of the disclosure.

In detail, FIG. 8 is a flowchart of generating a first maximum angle of a final angle range of the attention part according to an embodiment of the disclosure. In some embodiments, step S243 may be implemented as steps S2431 to S2433.

In step S2431, the server device 110 divides the difference between the first maximum angle in the professional angle range and another first maximum angle in the application angle range by a preset value to generate an adjustment variable. In step S2432, the server device 110 calculates the product of the adjustment variable and the model proportion. In step S2433, the server device 110 adds the first maximum angle of the professional angle range to the product to generate yet another first maximum angle of the final angle range. Specifically, the server device 110 may generate the first maximum angle of the final angle range of at least one attention part of the first target fitness posture according to the following Formula 1 and Formula 2.

$$\frac{P\text{Max} - A\text{Max}}{\text{Preset value}} = v P\text{Max} \quad \text{Formula 1}$$

$$F\text{Max} = P\text{Max} + v P\text{Max} \times \text{Model proportion} \quad \text{Formula 2}$$

PMax is the first maximum angle of the first attention part of the first target fitness posture in the expert motion model; AMax is the first maximum angle of the first attention part of the first target fitness posture in the application motion model; the preset value is, for example, 100; vPMax is the adjustment variable. FMax is the first maximum angle of the first attention part of the first target fitness posture in the final motion model; the model proportion is between 0% and 100%.

Similarly, in step S244, the server device 110 calculates the difference between the first minimum angle of the professional angle range of at least one attention part of the first target fitness posture in the expert motion model and another first minimum angle of the application angle range of at least one attention part of the first target fitness posture in the application motion model.

In step S245, the server device 110 generates yet another first minimum angle of the final angle range of at least one attention part of the first target fitness posture in the final motion model according to the difference between the first minimum angle of the professional angle range and another first minimum angle of the application angle range and the model proportion.

Specifically, the server device 110 may generate the first minimum angle of the final angle range of at least one attention part of the first target fitness posture according to the following Formula 3 and Formula 4.

$$\frac{P\text{Min} - A\text{Min}}{\text{Preset value}} = v P\text{Min} \quad \text{Formula 3}$$

$$F\text{Min} = P\text{Min} + v P\text{Min} \times \text{Model proportion} \quad \text{Formula 4}$$

PMin is the first minimum angle of the first attention part of the first target fitness posture in the expert motion model; AMin is the first minimum angle of the first attention part of the first target fitness posture in the application motion model; the preset value is, for example, 100; vPMin is another adjustment variable. FMin is the first minimum angle of the first attention part of the first target fitness posture in the final motion model; the model proportion is between 0% and 100%.

It may be seen that, based on the operating principles and processes shown in FIG. 6 and FIG. 8, the server device 110 may generate the final angle ranges of each attention part of each target fitness posture in the final motion model.

Figure 9:
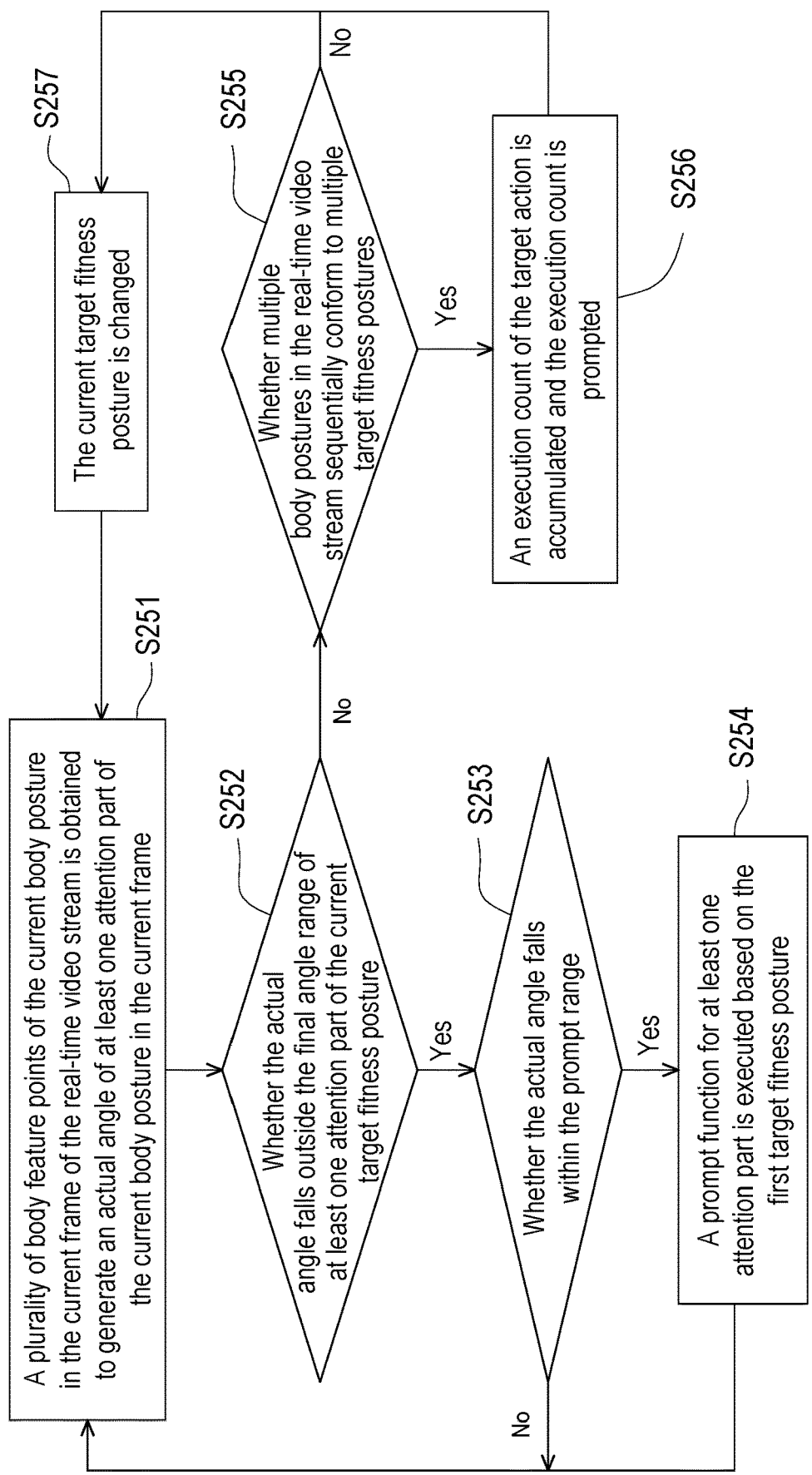
FIG. 9 is a flowchart of executing a prompt function according to a final motion model according to an embodiment of the disclosure.

FIG. 9 is a flowchart of executing a prompt function according to a final motion model according to an embodiment of the disclosure. Referring to FIG. 9, in some embodiments, step S250 in FIG. 2 may include steps S251 to S257.

In step S251, the user terminal device 120 obtains multiple body feature points of the current body posture in the current frame of the real-time video stream to generate an actual angle of at least one attention part of the current body posture in the current frame. The user terminal device 120 may periodically obtain the current frame from the real-time video stream, and may recognize the skeleton information in the current frame to obtain multiple body feature points of the current body posture. For the calculation principle of the actual angle of the attention part of the current body posture, please refer to the description of FIG. 3. Thereafter, the user terminal device 120 compares the actual angles of each attention part of the current body posture with the final angle ranges corresponding to each attention part of the current target fitness posture in the final motion model, so as to determine whether the current body posture conforms to the current target fitness posture.

It should be noted that the final motion model also defines the posture sequence of multiple target fitness postures. The user terminal device 120 determines that the user has completed a target fitness action when the multiple body postures in the real-time video stream match the multiple target fitness postures according to the posture sequence. Taking the target fitness action as squatting that includes two target fitness postures as an example, the user is required to execute the squatting posture first and then proceed to execute the standing posture before the user terminal device 120 determines that the user has completed a squat. It may be seen from this that the user terminal device 120 determines the current target fitness posture according to the posture sequence of the multiple target fitness postures.

In step S252, the user terminal device 120 determines whether the actual angle falls outside the final angle range of at least one attention part of the current target fitness posture. For example, the user terminal device 120 determines whether the actual angle of the left knee joint of the current body posture is greater than the maximum angle of the left knee joint of the current target fitness posture in the final motion model, and determines whether the actual angle of the left knee joint of the current body posture is less than the minimum angle of the left knee joint of the current target fitness posture in the final motion model.

If the determination in step S252 is "yes", it means that the current body posture of the user does not conform to the current target fitness posture. In step S253, the user terminal device 120 determines whether the actual angle falls within the prompt range. If the determination in step S253 is "no", it means that the difference between the current body posture and the current target fitness posture is too large, so the user terminal device 120 does not need to prompt the user yet.

If the determination in step S253 is "yes", in step S254, in response to the actual angle falling outside the final angle range of at least one attention part of the current target fitness posture and falling within the prompt range, the user terminal device 120 executes a prompt function for at least one attention part based on the current target fitness posture.

In some embodiments, the prompt range includes two adjacent angle ranges located on both sides of the final angle range. The user terminal device 120 may determine upper and lower limits of the prompt range based on the final angle range and a preset angle. For example, assuming that the final angle range is A degree to B degree, the prompt range may include (A−10) degree to A degree and B degree to (B+10) degree.

Figure 10B:
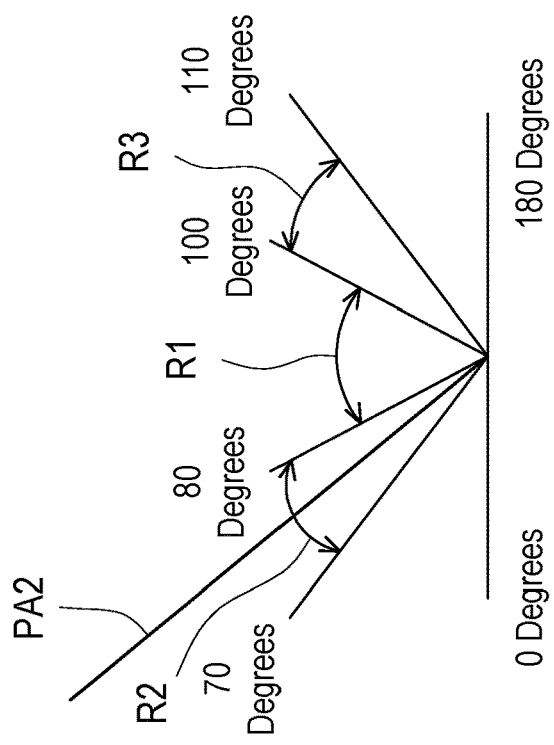
FIG. 10A and FIG. 10B are schematic diagrams of determining whether to provide a prompt according to an embodiment of the disclosure.
Figure 10A:
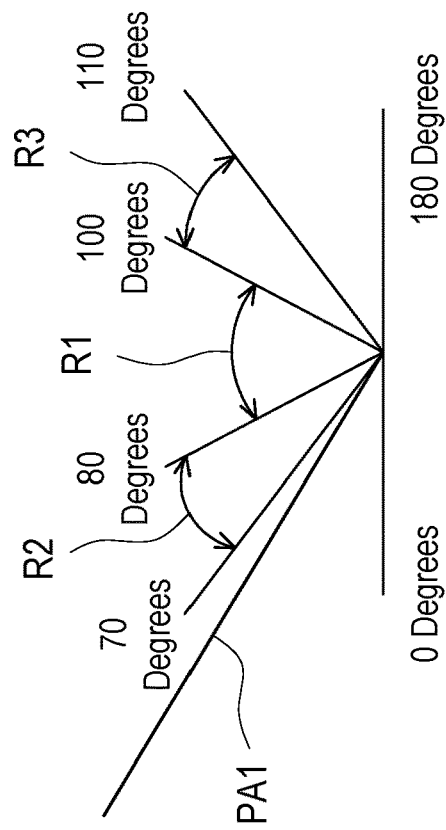

For example, FIG. 10A and FIG. 10B are schematic diagrams of determining whether to provide a prompt according to an embodiment of the disclosure. In the example of FIG. 10A and FIG. 10B, the final angle range R1 is 80 degrees to 100 degrees, and the prompt ranges R2 and R3 may include 70 degrees to 80 degrees and 100 degrees to 110 degrees. If the actual angle PA1 of the attention part of the current body posture is less than 70 degrees and not within the prompt range, the user terminal device 120 does not provide the prompt to the user. If the actual angle PA2 of the attention part of the current body posture is within the prompt range R2, the user terminal device 120 provides a prompt to the user, so that the user may obtain guidance on the current target fitness posture.

In some embodiments, the prompt function may include playing voice prompts through the speaker 122, displaying a user operation interface including at least one attention part with a visual mark through the display 121, or playing a demonstration video of the target fitness action through the display 121.

In some embodiments, the user terminal device 120 may determine the content of the voice prompt according to the difference between the actual angle of the attention part of the current body posture and the corresponding final angle range. Taking squatting as an example, if the actual angle of the left knee joint in the current body posture is greater than the maximum angle of the left knee joint in the squatting posture in the final motion model, the content of the voice prompt may include "Please continue to squat down." In other different application scenarios, the content of the voice prompt may also include "Stretch the left hand upward", "Stretch the left foot straight" or "Keep the trunk upright" and so on.

Figure 11:
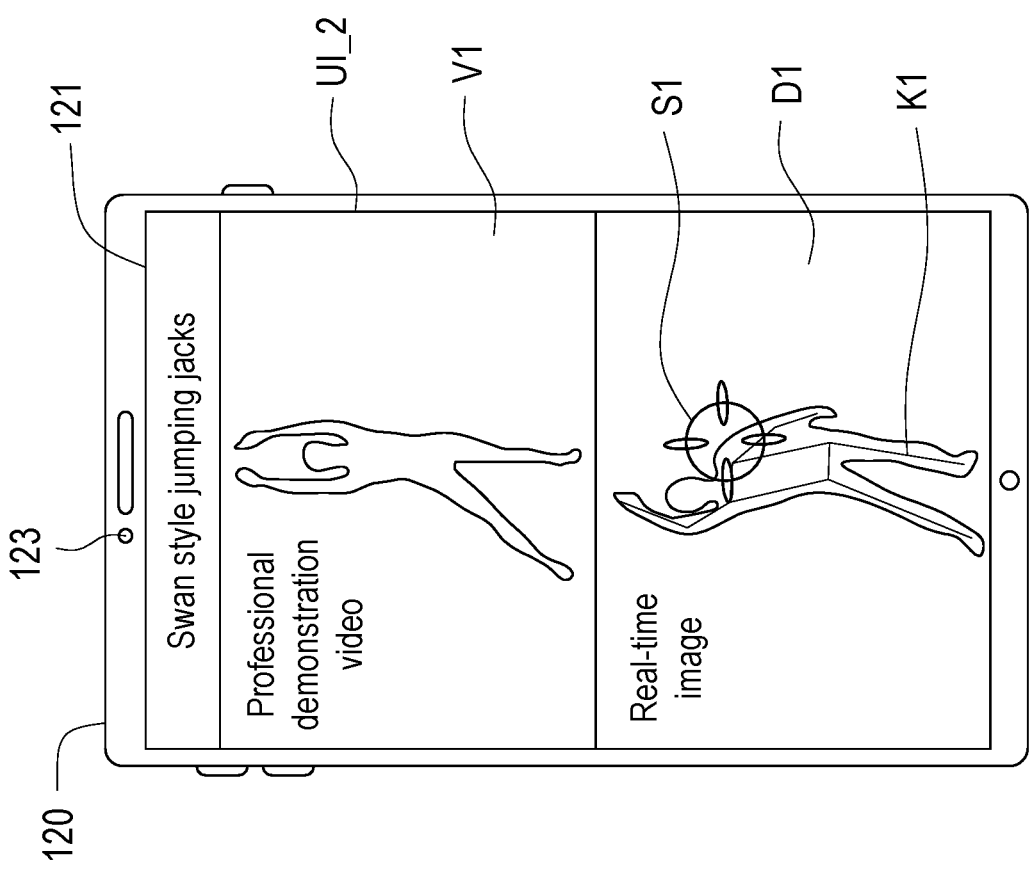
FIG. 11 is a schematic diagram of a user operation interface according to an embodiment of the disclosure.

FIG. 11 is a schematic diagram of a user operation interface according to an embodiment of the disclosure. Referring to FIG. 11, when the user terminal device 120 determines that the actual angle of the attention part of the current body posture falls outside the corresponding final angle range, the display 121 may display the user operation interface UI_2. The user operation interface UI_2 includes a professional demonstration video V1 and a real-time screen D1 captured by the image capture device 123. The real-time screen D1 may also include skeleton information K1 superimposed on the user image. In addition, in this example, the visual prompt provided by the user terminal device 120 includes the visual mark symbol S1. The user terminal device 120 may mark the attention part in the real-time screen D1 that does not conform to the final motion model with a visual mark symbol S1.

Figure 12:
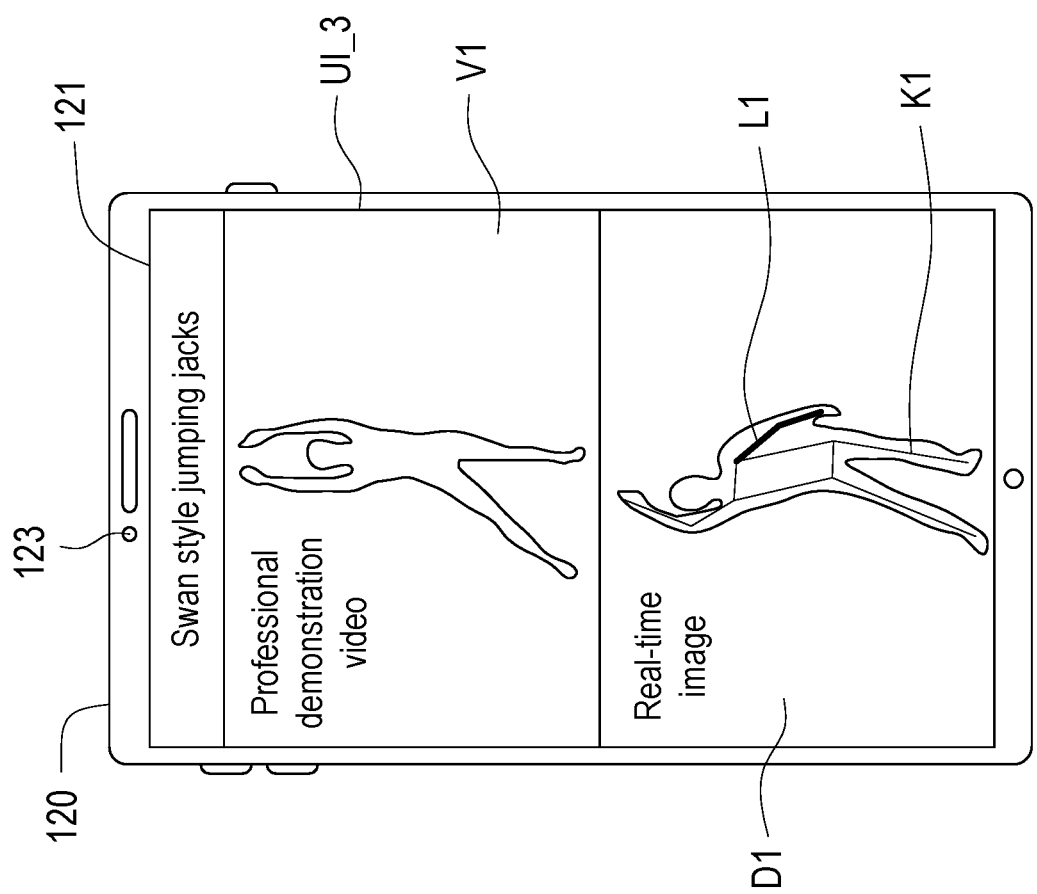
FIG. 12 is a schematic diagram of a user operation interface according to an embodiment of the disclosure.

FIG. 12 is a schematic diagram of a user operation interface according to an embodiment of the disclosure. Referring to FIG. 12, when the user terminal device 120 determines that the actual angle of the attention part of the current body posture falls outside the corresponding final angle range, the display 121 may display the user operation interface UI_3. The user operation interface UI_3 includes a professional demonstration video V1 and a real-time screen D1 captured by the image capture device 123. The real-time screen D1 may also include skeleton information K1 superimposed on the user image. In addition, in this example, the visual prompt provided by the user terminal device 120 includes using a special visual effect to present the skeleton segment of the attention part that does not conform to the final motion model. The user terminal device 120 may adjust the line segment color, line segment thickness, or various line segment display methods to provide special visual effects. As shown in FIG. 12, the user terminal device 120 may display the skeleton segment L1 corresponding to the left arm in a first color on the real-time screen D1, and may display the remaining skeleton segments in a second color.

Figure 13:
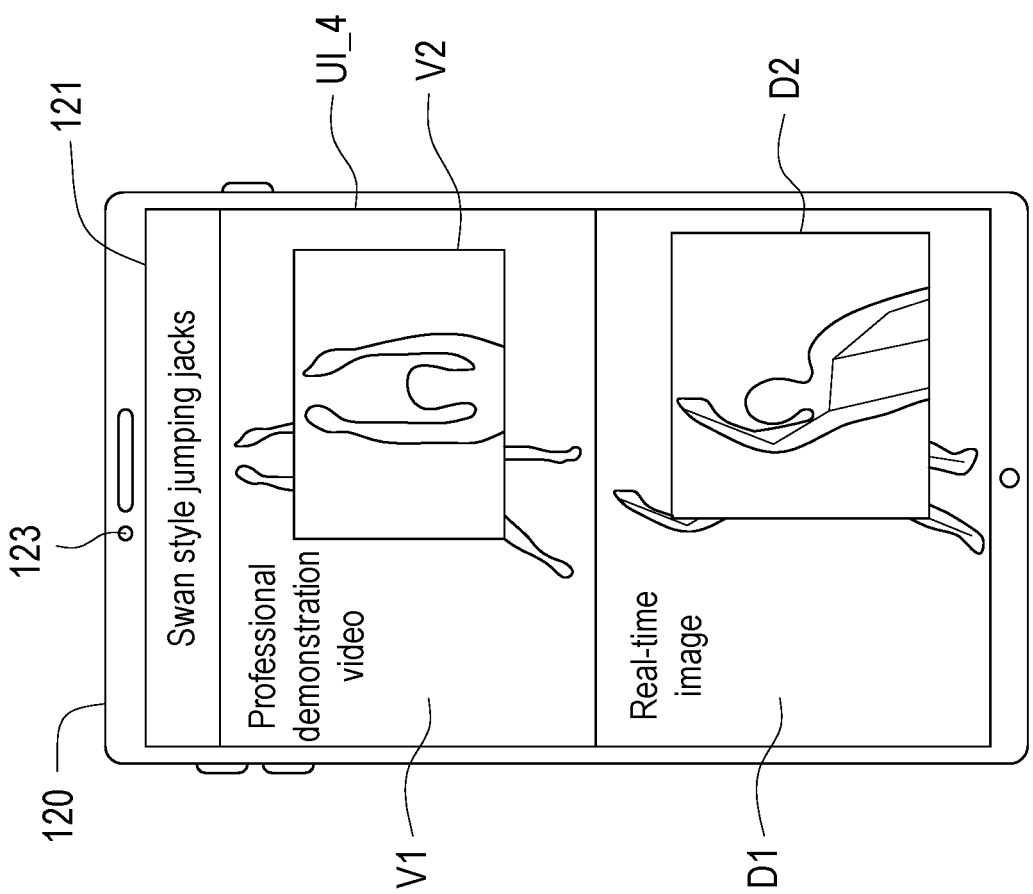
FIG. 13 is a schematic diagram of a user operation interface according to an embodiment of the disclosure.

FIG. 13 is a schematic diagram of a user operation interface according to an embodiment of the disclosure. Referring to FIG. 13, when the user terminal device 120 determines that the actual angle of the attention part of the current body posture falls outside the corresponding final angle range, the display 121 may display the user operation interface UI_4. The user operation interface UI_4 includes a professional demonstration video V1 and a real-time screen D1 captured by the image capture device 123. In this example, the visual prompt provided by the user terminal device 120 includes a close-up screen D2 of the real-time video stream and a close-up screen V2 of the professional demonstration video. Both the close-up screen D2 and the close-up screen V2 are generated by zooming in on the attention part that does not conform to the final motion model. In addition, in some embodiments, the user terminal device 120 may also slow down the playback speed of the professional demonstration video, so that the user may clearly understand the main points of the target fitness action.

Returning to FIG. 9, if the determination in step S253 is "no", it means that the current body posture conforms to the current target fitness posture. Then, in step S255, in response to the actual angle falling within the final angle range of at least one attention part of the current target fitness posture, the user terminal device 120 determines whether the body posture in the real-time video stream sequentially conforms to the target fitness posture. In some embodiments, if the current target fitness posture is the last target fitness posture of the target fitness action, the user terminal device 120 may determine that the body posture in the real-time video stream have sequentially conformed to multiple target fitness postures according to the posture sequence specified by the final motion model. Therefore, if the determination in step S255 is "yes", in step S256, in response to the body posture in the real-time video stream sequentially conforming to the target fitness posture, the user terminal device 120 accumulates the execution count of the target fitness action and prompts the execution count.

If the determination in step S255 is "no", it means that the user has not completed the target fitness action. Therefore, in step S257, the user terminal device 120 changes the current target fitness posture according to the posture sequence specified by the final motion model. For example, when the user terminal device 120 determines that the current body posture of a certain current frame conforms to the squatting posture of a squat, the user terminal device 120 changes the current target fitness posture from the squatting posture to the standing posture.

To sum up, in the embodiment of the disclosure, by comparing the final motion model with the body posture in the real-time video stream, whether the fitness actions of the user are correct may be determined. In addition, suitable attention parts may be flexibly set for different target fitness actions, so whether the fitness actions of the user are correct may be more effectively determined. In addition, in response to determining that the current body posture does not conform to the final motion model, prompts may be provided for specific attention parts, so that users may obtain easy-to-understand and real-time fitness guidance information. In this way, the user may exercise more efficiently and safely in a very convenient way in the process of exercising alone.

What is claimed is:

1. A fitness posture guidance method, comprising:
   receiving a setting of a plurality of target fitness postures and at least one attention part of a target fitness action;
   obtaining a plurality of target frames respectively corresponding to the target fitness postures from an expert video according to a plurality of marked times;
   obtaining a professional angle range of the at least one attention part of each of the target fitness postures based on a plurality of body feature points of each of the target frames to generate an expert motion model of the target fitness action;

integrating the expert motion model with an application angle range of the at least one attention part of each of the target fitness postures in an application motion model to generate a final motion model comprising a final angle range of the at least one attention part of each of the target fitness postures; and executing a prompt function according to the final motion model and a plurality of body postures in a real-time video stream captured by an image capture device, further comprising:

analyzing a degree of similarity between a current body posture in a current frame and a current target fitness posture, wherein each of the plurality of body postures comprise the current body posture.

2. The fitness posture guidance method according to claim 1, wherein the step of obtaining the professional angle range of the at least one attention part of each of the target fitness postures based on the body feature points of each of the target frames comprises:

generating the body feature points of each of the target frames, wherein the target frames comprise a plurality of first target frames all corresponding to a first target fitness posture among the target fitness postures;

generating a plurality of first angles of the at least one attention part of the first target fitness posture according to the body feature points of the first target frames; and determining a first maximum angle and a first minimum angle of the professional angle range of the at least one attention part of the first target fitness posture according to the first angles of the at least one attention part of the first target fitness posture.

3. The fitness posture guidance method according to claim 2, wherein the target frames comprise a plurality of second target frames all corresponding to a second target fitness posture among the target fitness postures, and the step of obtaining the professional angle range of the at least one attention part of each of the target fitness postures based on the body feature points of each of the target frames comprises:

generating a plurality of second angles of the at least one attention part of the second target fitness posture according to the body feature points of each of the target frames; and determining a second maximum angle and a second minimum angle of the professional angle range of the at least one attention part of the second target fitness posture according to the second angles of the at least one attention part of the second target fitness posture.

4. The fitness posture guidance method according to claim 2, wherein the step of determining the first maximum angle and the first minimum angle of the professional angle range of the at least one attention part of the first target fitness posture according to the first angles of the at least one attention part of the first target fitness posture comprises:

obtaining a maximum reference angle and a minimum reference angle among the first angles; and generating the first maximum angle and the first minimum angle of the at least one attention part of the first target fitness posture according to a preset adjustment factor, the maximum reference angle, and the minimum reference angle.

5. The fitness posture guidance method according to claim 1, wherein the target fitness postures comprises a first target fitness posture, and the step of integrating the expert motion model with the application angle range of the at least one attention part of each of the target fitness postures in the application motion model to generate the final motion model comprising the final angle range of the at least one attention part of each of the target fitness postures comprises:

calculating a difference between a first maximum angle of the professional angle range of the at least one attention part of the first target fitness posture in the expert motion model and another first maximum angle of the application angle range of the at least one attention part of the first target fitness posture in the application motion model; and generating yet another first maximum angle of the final angle range of the at least one attention part of the first target fitness posture in the final motion model according to the difference and a model proportion.

6. The fitness posture guidance method according to claim 5, wherein the step of generating the yet another first maximum angle of the final angle range of the at least one attention part of the first target fitness posture in the final motion model according to the difference and the model proportion comprises:

dividing the difference by a preset value to generate an adjustment variable;

calculating a product of the adjustment variable and the model proportion; and adding the first maximum angle of the professional angle range to the product to generate the yet another first maximum angle of the final angle range.

7. The fitness posture guidance method according to claim 1, wherein the target fitness postures comprise a first target fitness posture, and the step of integrating the expert motion model with the application angle range of the at least one attention part of each of the target fitness postures in the application motion model to generate the final motion model comprising the final angle range of the at least one attention part of each of the target fitness postures comprises:

calculating a difference between a first minimum angle of the professional angle range of the at least one attention part of the first target fitness posture in the expert motion model and another first minimum angle of the application angle range of the at least one attention part of the first target fitness posture in the application motion model; and generating yet another first minimum angle of the final angle range of the at least one attention part of the first target fitness posture in the final motion model according to the difference and a model proportion.

8. The fitness posture guidance method according to claim 1, wherein the target fitness postures comprise the current target fitness posture, and the step of executing the prompt function according to the final motion model and the body postures in the real-time video stream captured by the image capture device comprises:

obtaining a plurality of body feature points of the current body posture in the current frame of the real-time video stream to generate an actual angle of the at least one attention part of the current body posture in the current frame; and in response to the actual angle falling outside the final angle range of the at least one attention part of the current target fitness posture and falling within a prompt range, executing the prompt function for the at least one attention part based on the current target fitness posture.

9. The fitness posture guidance method according to claim 8, wherein the step of executing the prompt function according to the final motion model and the body postures in the real-time video stream captured by the image capture device comprises:
in response to the actual angle falling within the final angle range of the at least one attention part of the current target fitness posture, determining whether the body postures in the real-time video stream sequentially conform to the target fitness postures; and
in response to the body postures in the real-time video stream sequentially conforming to the target fitness postures, accumulating an execution count of the target fitness action and prompting the execution count.

10. The fitness posture guidance system according to claim 8, wherein the prompt function comprises playing a voice prompt through a speaker, displaying a user operation interface comprising the at least one attention part with a visual mark through a display, or playing a demonstration video of the target fitness action through the display.

11. A fitness posture guidance system, comprising:
a server device; and
a user terminal device, comprising an image capture device, and connected to the server device through a network,
wherein the server device is configured to execute:
receiving a setting of a plurality of target fitness postures and at least one attention part of a target fitness action;
obtaining a plurality of target frames respectively corresponding to the target fitness postures from an expert video according to a plurality of marked times;
obtaining a professional angle range of the at least one attention part of each of the target fitness postures based on a plurality of body feature points of each of the target frames to generate an expert motion model of the target fitness action; and
integrating the expert motion model with an application angle range of the at least one attention part of each of the target fitness postures in an application motion model to generate a final motion model comprising a final angle range of the at least one attention part of each of the target fitness postures,
wherein the user terminal device is configured to execute:
obtaining the final motion model of the target fitness action from the server device; and
executing a prompt function according to the final motion model and a plurality of body postures in a real-time video stream captured by an image capture device, further comprising:
analyzing a degree of similarity between a current body posture in a current frame and a current target fitness posture, wherein each of the plurality of body postures comprise the current body posture.

12. The fitness posture guidance system according to claim 11, wherein the server device is configured to execute:
generating the body feature points of each of the target frames, wherein the target frames comprise a plurality of first target frames all corresponding to a first target fitness posture among the target fitness postures;
generating a plurality of first angles of the at least one attention part of the first target fitness posture according to the body feature points of the first target frames; and
determining a first maximum angle and a first minimum angle of the professional angle range of the at least one attention part of the first target fitness posture according to the first angles of the at least one attention part of the first target fitness posture.

13. The fitness posture guidance system according to claim 12, wherein the target frames comprise a plurality of second target frames all corresponding to a second target fitness posture among the target fitness postures, and the server device is configured to execute:
generating a plurality of second angles of the at least one attention part of the second target fitness posture according to the body feature points of each of the target frames; and
determining a second maximum angle and a second minimum angle of the professional angle range of the at least one attention part of the second target fitness posture according to the second angles of the at least one attention part of the second target fitness posture.

14. The fitness posture guidance system according to claim 12, wherein the server device is configured to execute:
obtaining a maximum reference angle and a minimum reference angle among the first angles; and
generating the first maximum angle and the first minimum angle of the at least one attention part of the first target fitness posture according to a preset adjustment factor, the maximum reference angle, and the minimum reference angle.

15. The fitness posture guidance system according to claim 11, wherein the target fitness postures comprise a first target fitness posture, and the server device is configured to execute:
calculating a difference between a first maximum angle of the professional angle range of the at least one attention part of the first target fitness posture in the expert motion model and another first maximum angle of the application angle range of the at least one attention part of the first target fitness posture in the application motion model; and
generating yet another first maximum angle of the final angle range of the at least one attention part of the first target fitness posture in the final motion model according to the difference and a model proportion.

16. The fitness posture guidance system according to claim 15, wherein the server device is configured to execute:
dividing the difference by a preset value to generate an adjustment variable;
calculating a product of the adjustment variable and the model proportion; and
adding the first maximum angle of the professional angle range to the product to generate the yet another first maximum angle of the final angle range.

17. The fitness posture guidance system according to claim 11, wherein the target fitness postures comprise a first target fitness posture, and the server device is configured to execute:
calculating a difference between a first minimum angle of the professional angle range of the at least one attention part of the first target fitness posture in the expert motion model and another first minimum angle of the application angle range of the at least one attention part of the first target fitness posture in the application motion model; and
generating yet another first minimum angle of the final angle range of the at least one attention part of the first target fitness posture in the final motion model according to the difference and a model proportion.

18. The fitness posture guidance system according to claim 11, wherein the target fitness postures comprise the current target fitness posture, and the user terminal device is configured to execute:
obtaining a plurality of body feature points of the current body posture in the current frame of the real-time video stream to generate an actual angle of the at least one attention part of the current body posture in the current frame; and in response to the actual angle falling outside the final angle range of the at least one attention part of the current target fitness posture and falling within a prompt range, executing the prompt function for the at least one attention part based on the current target fitness posture.

19. The fitness posture guidance system according to claim 18, wherein the user terminal device is configured to execute:

in response to the actual angle falling within the final angle range of the at least one attention part of the current target fitness posture, determining whether the body postures in the real-time video stream sequentially conform to the target fitness postures; and in response to the body postures in the real-time video stream sequentially conforming to the target fitness postures, accumulating an execution count of the target fitness action and prompting the execution count.

20. The fitness posture guidance system according to claim 18, wherein the prompt function comprises playing a voice prompt through a speaker, displaying a user operation interface comprising the at least one attention part with a visual mark through a display, or playing a demonstration video of the target fitness action through the display.

* * * * *